US007949792B2

(12) United States Patent
Kujk et al.

(10) Patent No.: US 7,949,792 B2
(45) Date of Patent: May 24, 2011

(54) ENCODING A TCP OFFLOAD ENGINE WITHIN FCP

(75) Inventors: Timothy Kujk, Lino Lakes, MN (US); David Thompson, Rogers, MN (US); Stephen DeGroote, Maple Grove, MN (US); Murali Basavaiah, Sunnyvale, CA (US); Anand Parthasarathy, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1339 days.

(21) Appl. No.: 10/836,368

(22) Filed: Apr. 29, 2004

(65) Prior Publication Data

US 2005/0190787 A1     Sep. 1, 2005

Related U.S. Application Data

(60) Provisional application No. 60/548,766, filed on Feb. 27, 2004.

(51) Int. Cl.
| | |
|---|---|
| G06F 15/16 | (2006.01) |
| G06F 9/44 | (2006.01) |
| G06F 9/46 | (2006.01) |
| G06F 17/30 | (2006.01) |
| H04L 12/28 | (2006.01) |
| H04L 12/54 | (2006.01) |
| H04L 12/56 | (2006.01) |
| G06F 3/00 | (2006.01) |
| G06F 13/00 | (2006.01) |
| G06F 3/12 | (2006.01) |
| G06F 7/00 | (2006.01) |
| G06F 17/00 | (2006.01) |
| G06F 12/00 | (2006.01) |
| G11C 29/00 | (2006.01) |

(52) U.S. Cl. ........ 709/250; 709/218; 709/219; 709/236; 709/249; 370/395.52; 370/395.54; 370/428; 719/326

(58) Field of Classification Search .................. 709/203, 709/218, 219, 236, 249, 250, 253; 370/395.52–395.54, 395.72, 402, 412, 428; 719/326; 358/1.15; 707/3; 714/805
See application file for complete search history.

(56) References Cited

U.S. PATENT DOCUMENTS 6,160,811 A * 12/2000 Partridge et al. .............. 370/401
(Continued)

FOREIGN PATENT DOCUMENTS

WO     2005/091826 A2     10/2005

OTHER PUBLICATIONS

Krueger, M. et al. "Small Computer Systems Interface Protocol over the Internet (iSCSI) Requirements and Design Considerations," RFC 3347, Jul. 2002, pp. 1-26.*

(Continued)

Primary Examiner — Ian N Moore
Assistant Examiner — Melvin H Pollack
(74) Attorney, Agent, or Firm — Weaver Austin Villeneuve & Sampson LLP

(57) ABSTRACT

The present invention defines a new protocol for communicating with an offload engine that provides Transmission Control Protocol ("TCP") termination over a Fibre Channel ("FC") fabric. The offload engine terminates all protocols up to and including TCP and performs the processing associated with those layers. The offload protocol guarantees delivery and is encapsulated within FCP-formatted frames. Thus, the TCP streams are reliably passed to the host. Additionally, using this scheme, the offload engine can provide parsing of the TCP stream to further assist the host. The present invention also provides network devices (and components thereof) that are configured to perform the foregoing methods. The invention further defines how network attached storage ("NAS") protocol data units ("PDUs") are parsed and delivered.

26 Claims, 11 Drawing Sheets

U.S. PATENT DOCUMENTS

| | | | |
|---|---|---|---|
| 6,304,912 B1* | 10/2001 | Oguchi et al. | 709/238 |
| 6,421,730 B1* | 7/2002 | Narad et al. | 709/236 |
| 6,430,184 B1* | 8/2002 | Robins et al. | 370/392 |
| 6,560,630 B1* | 5/2003 | Vepa et al. | 718/105 |
| 6,601,101 B1* | 7/2003 | Lee et al. | 709/227 |
| 6,606,690 B2* | 8/2003 | Padovano | 711/148 |
| 6,697,846 B1* | 2/2004 | Soltis | 709/217 |
| 6,738,821 B1* | 5/2004 | Wilson et al. | 709/230 |
| 6,792,507 B2* | 9/2004 | Chiou et al. | 711/119 |
| 6,826,613 B1* | 11/2004 | Wang et al. | 709/227 |
| 6,985,975 B1* | 1/2006 | Chamdani et al. | 710/55 |
| 7,010,469 B2* | 3/2006 | Anderson et al. | 702/194 |
| 7,027,413 B2* | 4/2006 | Lee et al. | 370/255 |
| 7,031,904 B1* | 4/2006 | Wilson et al. | 709/230 |
| 7,089,293 B2* | 8/2006 | Grosner et al. | 709/217 |
| 7,120,705 B2* | 10/2006 | Arai et al. | 710/5 |
| 7,127,638 B1* | 10/2006 | Sardella et al. | 714/15 |
| 7,180,909 B1* | 2/2007 | Achler | 370/466 |
| 7,197,047 B2* | 3/2007 | Latif et al. | 370/466 |
| 7,245,632 B2* | 7/2007 | Heffernan et al. | 370/465 |
| 7,249,227 B1* | 7/2007 | Pittman | 711/154 |
| 7,260,112 B2* | 8/2007 | Moretti et al. | 370/467 |
| 7,269,168 B2* | 9/2007 | Roy et al. | 370/374 |
| 7,269,696 B2* | 9/2007 | Muhlestein et al. | 711/147 |
| 7,284,070 B2* | 10/2007 | Boucher et al. | 709/250 |
| 7,295,561 B1* | 11/2007 | Yao et al. | 370/400 |
| 7,299,290 B2* | 11/2007 | Karpoff | 709/231 |
| 7,305,670 B2* | 12/2007 | Ogasawara et al. | 717/171 |
| 7,313,142 B2* | 12/2007 | Matsuo et al. | 370/395.32 |
| 7,313,614 B2* | 12/2007 | Considine et al. | 709/223 |
| 7,320,037 B1* | 1/2008 | Maturi et al. | 709/236 |
| 7,325,051 B2* | 1/2008 | Das et al. | 709/223 |
| 7,353,305 B2* | 4/2008 | Pangal et al. | 710/74 |
| 7,362,702 B2* | 4/2008 | Terrell et al. | 370/230 |
| 7,376,765 B2* | 5/2008 | Rangan et al. | 710/38 |
| 7,386,610 B1* | 6/2008 | Vekiarides | 709/224 |
| 7,401,093 B1* | 7/2008 | Hamilton et al. | 707/102 |
| 7,404,000 B2* | 7/2008 | Lolayekar et al. | 709/230 |
| 7,406,484 B1* | 7/2008 | Srinivasan et al. | 707/200 |
| 7,412,588 B2* | 8/2008 | Georgiou et al. | 712/34 |
| 7,415,506 B2* | 8/2008 | Gajjar et al. | 709/215 |
| 7,415,723 B2* | 8/2008 | Pandya | 726/13 |
| 7,426,212 B2* | 9/2008 | Someya et al. | 370/401 |
| 7,426,576 B1* | 9/2008 | Banga et al. | 709/245 |
| 7,433,351 B1* | 10/2008 | Pelissier et al. | 370/389 |
| 7,457,982 B2* | 11/2008 | Rajan | 714/15 |
| 7,460,473 B1* | 12/2008 | Kodama et al. | 370/230 |
| 7,478,101 B1* | 1/2009 | Manley | 707/100 |
| 7,483,423 B2* | 1/2009 | Grewal et al. | 370/389 |
| 7,487,283 B2* | 2/2009 | Sivertsen | 710/306 |
| 7,496,688 B2* | 2/2009 | Pepper | 709/249 |
| 7,535,913 B2* | 5/2009 | Minami et al. | 370/401 |
| 7,558,264 B1* | 7/2009 | Lolayekar et al. | 370/392 |
| 7,583,681 B2* | 9/2009 | Green | 370/401 |
| 7,586,942 B2* | 9/2009 | Golasky et al. | 370/466 |
| 7,590,807 B2* | 9/2009 | McGovern et al. | 711/159 |
| 7,594,002 B1* | 9/2009 | Thorpe et al. | 709/219 |
| 7,627,693 B2* | 12/2009 | Pandya | 709/250 |
| 7,656,905 B2* | 2/2010 | Sheth et al. | 370/503 |
| 7,688,735 B1* | 3/2010 | Berman | 370/235.1 |
| 7,711,539 B1* | 5/2010 | Kimmel et al. | 703/24 |
| 7,743,111 B2* | 6/2010 | Soltis | 709/217 |
| 7,752,361 B2* | 7/2010 | Rangan et al. | 710/74 |
| 7,792,923 B2* | 9/2010 | Kim | 709/218 |
| 7,864,758 B1* | 1/2011 | Lolayekar et al. | 370/389 |
| 2001/0049740 A1 | 12/2001 | Karpoff | |
| 2002/0002625 A1 | 1/2002 | Vange et al. | |
| 2002/0026502 A1* | 2/2002 | Phillips et al. | 709/219 |
| 2002/0078299 A1 | 6/2002 | Chiou et al. | |
| 2002/0120741 A1* | 8/2002 | Webb et al. | 709/225 |
| 2003/0051135 A1 | 3/2003 | Gill et al. | |
| 2004/0030766 A1* | 2/2004 | Witkowski | 709/223 |
| 2004/0093411 A1* | 5/2004 | Elzur et al. | 709/224 |
| 2004/0103220 A1* | 5/2004 | Bostick et al. | 709/253 |
| 2004/0117496 A1* | 6/2004 | Mittal et al. | 709/230 |
| 2004/0210584 A1* | 10/2004 | Nir et al. | 707/10 |
| 2004/0236866 A1* | 11/2004 | Dugatkin et al. | 709/235 |
| 2005/0015642 A1* | 1/2005 | Hannel et al. | 714/4 |

OTHER PUBLICATIONS

Weber, R. et al. "Fibre Channel (FC) Frame Encapsulation," RFC 3643, Dec. 2003, pp. 1-20.*
Teow, K. S. "Definitions of Managed Objects for the Fabric Element in Fibre Channel Standard," RFC 2837, May 2000, pp. 1-48.*
Crawford, M. "A Method for the Transmission of IPv6 Packets over FDDI Networks," RFC 2019, Oct. 1996, pp. 1-6.*
Flick, J. "Definitions of Managed Objects for the Ethernet-like Interface Types," RFC 3635, Sep. 2003, pp. 1-64.*
Balay, R. et al. "IS-IS Mesh Groups," RFC 2973, Oct. 2000, pp. 1-8.*
Gibson, Garth and Van Meter, Rodney. "Network Attached Storage Architecture," Communications of the ACM, vol. 43, Issue 11, Nov. 2000, pp. 37-45.*
Nagle, David F. et al. "Network Support for Network-Attached Storage," Proceedings of Hot Interconnects, Aug. 18-20, 1999, pp. 1-6.*
Gibson, Garth A. et al. "File Server Scaling with Network-Attached Secure Disks," Proceedings of the 1997 ACM SIGMETRICS International Conference on Measurement and Modeling of Computer Systems, 1997, pp. 272-284.*
Riedel, Erik. "Active Disks—Remote Execution for Network-Attached Storage," Doctor of Philosophy Dissertation, School of Computer Science, Carnegie Mellon University, 1999, pp. 1-203.*
Menon, J. et al. "IBM Storage Tank—A Heterogeneous Scalable SAN File System," IBM Systems Journal, vol. 42, No. 2, 2003, pp. 250-267.*
Knowles, M. "Survey of the Storage Evolution," Proceedings of the User Group Conference, Jun. 9-13, 2003, pp. 362-367.*
Caroline Larson et al., Introduction to ISCSI, Version 1.0, Mar. 2002, 6 pages.
Ahmad Zamer, Clearing the Confusion: A Primer on Internet Protocol Storage, Part II, Storage Networking Industry Association, 95 pages.
Request for Comments: 2625, IP and ARP Over Fibre Channel, Jun. 1999, 71 pages.
International Search Report dated Jul. 19, 2006, from corresponding PCT patent application No. PCT/US05/04941, with Notification of Transmittal.
Written Opinion of International Searching Authority, dated Jul. 19, 2006 from Corresponding PCT patent application No. PCT/US05/04941.
Office Action dated May 26, 2009 from Canadian Patent Application No. 2,555,428.
U.S. Appl. No. 12/641,909, filed Dec. 18, 2009.
First Office Action dated Jan. 8, 2010 for China Patent Application No. 200580004483.1.
Second Action dated Jun. 11, 2010 from Canadian Patent Application No. 2,555,428.
Translation of Second Office Action dated Sep. 29, 2010 for China Patent Application No. 200580004483.1.

* cited by examiner

ENCODING A TCP OFFLOAD ENGINE WITHIN FCP

CROSS-REFERENCE TO RELATED APPLICATION

This application claims priority to U.S. Provisional Patent Application No. 60/548,766, entitled "Encoding a TCP Offload Engine Within FCP" and filed on Feb. 27, 2004, which is hereby incorporated by reference in its entirety for all purposes.

BACKGROUND OF THE INVENTION

1. Field of the Invention

The present invention relates to computer networks. More specifically, the present invention relates to methods and devices for communicating with a Transmission Control Protocol ("TCP") offload engine ("TOE").

2. Description of Related Art

In recent years, the communication speed in networked systems has surpassed the growth of microprocessor performance in many network devices. For example, Ethernet has become the most commonly-used networking protocol for local area networks. The increase in speed from 10 Mb/s Ethernet to 10 Gb/s Ethernet has not been matched by a commensurate increase in the performance of processors used in most network devices.

This phenomenon has produced an input/output (I/O) bottleneck because network device processors cannot always keep up with the rate of data flow through a network. An important reason for the bottleneck is that the TCP/IP stack is processed at a rate slower than the speed of the network. The processing of TCP/IP has typically been performed by software running on a central processor of a server. Reassembling out-of-order packets, processing interrupts and performing memory copies places a significant load on the CPU. In high-speed networks, such a CPU may need more processing capability for network traffic than for running other applications.

A TCP/IP offload engine ("TOE") helps to relieve this I/O bottleneck by removing the burden (offloading) of processing TCP/IP from the microprocessor(s) and I/O subsystem. A TOE has typically been implemented in a host bus adapter ("HBA") or a network interface card ("NIC").

The growing popularity of network storage applications such as Internet Protocol storage ("IPS") has placed even greater TCP/IP processing burdens on network devices. The iSCSI (Internet Small Computer Systems Interface) protocol is commonly used to establish and maintain connections between IP-based storage devices, hosts and clients. iSCSI employs an encapsulated SCSI protocol for mapping of block-oriented storage data over TCP/IP networks. Every TCP connection that is part of an iSCSI session includes TCP processing overhead for, e.g., setup/teardown of connections, window management, congestion control, checksum calculations, interrupts, memory copies, etc. Therefore, it is highly desirable to implement TCP offload mechanisms to enhance network storage performance.

In addition to placing a TCP/IP processing burden on network devices, the implementation of IP storage using iSCSI (or similar protocols) is problematic for other reasons. For example, related iSCSI protocol data units ("PDUs") may take varying paths through a network and arrive out of order. Sometimes an iSCSI header may not be received when expected because the TCP segment that it was part of was delivered out of order. In some instances, one or more PDUs may not arrive at all.

Further complications are introduced when the network application involves accessing, via an IP network, storage devices that are part of a Fibre Channel ("FC") network. The storage device may be, for example, a network attached storage ("NAS") device on an FC network that is accessed by a NAS client via an IP network. The two application protocols commonly used by NAS servers are the Network File System ("NFS") and the Common Internet File System ("CIFS"). Many NAS systems also support Hypertext Transfer Protocol ("HTTP"), allowing a NAS client to download files using a Web browser from a NAS server that supports HTTP.

Prior art TOEs do not provide satisfactory methods for processing traffic from NAS clients on a TCP/IP network directed to a NAS server on an FC network. In such a system, there is no TCP connection to the NAS server. Prior art systems do not allow a NAS server to place data from a TOE in a specific memory location and require data coming from the IP network to be copied from various memory locations for reconstruction on the FC side. It would be desirable to develop systems and methods that address some or all of the limitations of the prior art.

SUMMARY OF THE INVENTION

The present invention defines a new protocol for communicating with an offload engine that provides Transmission Control Protocol ("TCP") termination over a Fibre Channel ("FC") fabric. The offload engine will terminate all protocols up to and including TCP and performs processing associated with those layers. The offload protocol guarantees delivery and is encapsulated within FC-formatted frames. Thus, the TCP streams are reliably passed to the host. Additionally, using this scheme, the offload engine can provide parsing of the TCP stream to further assist the host. The present invention also provides network devices (and components thereof) that are configured to perform the foregoing methods. The invention further defines how network attached storage ("NAS") protocol data units ("PDUs") are parsed and delivered.

The present invention also provides devices, such as line cards (a/k/a "blades"), hosts, switches and routers, which are configured to perform, at least in part, the foregoing methods. The invention also encompasses networks over which such devices may be operated in order to perform some aspects of the invention. According to some implementations, the central components are a host in communication with an offload engine via an FC fabric. The offload engine has access to the networking interface(s). Moreover, the invention includes business methods that may be implemented according to some aspects of the invention.

Some aspects of the invention provide a method for implementing network storage. The method includes the following steps: storing information received from a network attached storage (NAS) client on an Internet Protocol (IP) network; parsing the stored information; and transmitting results from the parsing step to a NAS device on a Fibre Channel (FC) network. The method may involve terminating all protocols up to and including Transmission Control Protocol (TCP) on the FC network.

Alternative aspects of the invention provide other methods for implementing network storage. Some such methods include the following steps: storing a data read request received from a network attached storage (NAS) client on an Internet Protocol (IP) network, the data read request directed to data stored in a storage device on a Fibre Channel (FC) network; parsing the stored information; and allocating a memory space of an offload engine that performs the parsing step, the allocating step being performed according to the results of the parsing step.

Still other methods of the present invention include the following steps:
providing an interface between a network attached storage (NAS) client on an Internet Protocol (IP) network and a NAS device on a Fibre Channel (FC) network; and
terminating all protocols up to and including Transmission Control Protocol (TCP) on the FC network.

Some embodiments of the invention provide a line card, including: a Fibre Channel (FC) interface; an Ethernet interface; a memory; and an offload engine. The offload engine is configured to do the following: store information received from a network attached storage (NAS) client on an Internet Protocol (IP) network via the Ethernet interface; parse the stored information; and transmit results from the parsing step to a NAS device on a Fibre Channel network via the FC interface. Other embodiments of the invention provide a network device that includes the line card. Yet other embodiments of the invention provide a computer network that includes the network device and the NAS device. In some embodiments, the network device includes the line card and the NAS device.

Some embodiments of the invention provide a network attached storage (NAS) device, including: a Fibre Channel (FC) interface; a memory; and one or more processors configured to allocate space in the memory according to NAS header information received from a Transmission Control Protocol (TCP) offload engine via the FC interface, the header information corresponding to a command from a NAS client on an Internet Protocol (IP) network.

Still other embodiments of the invention provide a computer program stored on a machine-readable medium. The computer program includes instructions to control a Transmission Control Protocol (TCP) offload engine to perform the following steps: store information received from a network attached storage (NAS) client on an Internet Protocol (IP) network; parse the stored information; and transmit results from the parsing step to a NAS device on a Fibre Channel (FC) network.

Yet other implementations of the invention provide a method of reliably providing account information to a customer. The method includes the following steps: storing a request for account information received from a network attached storage (NAS) client on an Internet Protocol (IP) network; parsing the stored request; transmitting results from the parsing step to a NAS device on a Fibre Channel (FC) network; allocating space in a memory of the NAS device according to the results; retrieving the requested account information from a storage device on the FC network; and storing the requested account information in the allocated memory space.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Figure 1A:
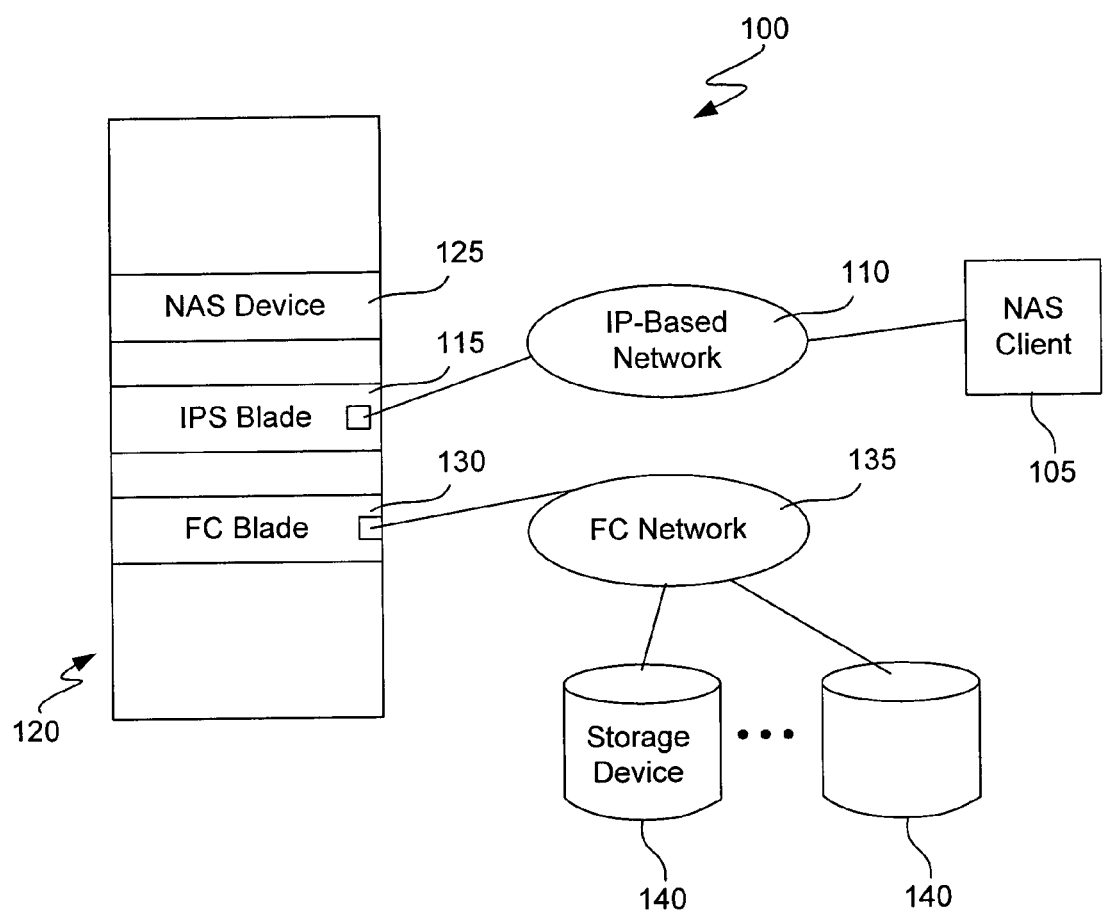
FIGS. 1A and 1B are network diagrams that illustrate some contexts within which the present invention may be implemented.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, it should be noted that the techniques of the present invention can be applied to a variety of different protocols and networks. In the following description, numerous specific details are set forth in order to provide a thorough understanding of the present invention. The present invention may be practiced without some or all of these specific details. In other instances, well known process operations have not been described in detail in order to not obscure the present invention.

Network storage has become increasingly popular and has become a vital service provided to various types of businesses, such as banks, credit card companies, brokerage firms, manufacturing companies, research and development companies, government entities, academic institutions, content providers and many other public and private entities. In some applications, network storage is used to back up hosted customer data or content at a remote data center. As used herein, the term "data" will include what is generally referred to as "content." The data may be, for example, customer account and transaction information that is maintained by a financial institution (e.g., a bank, a credit card company or a brokerage firm), an Internet service provider, a communications company, an airline, or any other entity in the private or public sector (e.g. the Internal Revenue Service). Those of skill in the art will realize that many other types of data may be involved.

In some such applications, the customer data are kept continuously synchronized across the network. Rapidly-changing or volatile data may be continuously replicated at a data center. Alternatively, in outsourced storage hosting applications, a customer's network devices may access a data center's storage devices for primary data storage. The remote data center may be, for example, in the same city or in a different geographical region. All of the above applications (and more known by those of skill in the art) may be enhanced by implementing methods of the present invention.

The present invention provides improved methods and devices for implementing network storage solutions. In particular, the present invention defines a new protocol (sometimes referred to herein as an "offload protocol") for communications involving a TOE. The offload protocol is particularly advantageous when used for communications related to network storage applications.

In preferred implementations, the TOE provides TCP termination over an FC fabric. The TOE will terminate all protocols up to and including TCP and will perform processing associated with those layers. For example, the TOE preferably provides TCP checksum handling, TCP retransmission, etc. The offload protocol guarantees delivery and is encapsulated within FCP-formatted frames. Thus, the TCP streams are reliably passed to the host. Additionally, using this scheme, the offload engine can provide parsing of, e.g., NAS protocols within the TCP stream to further assist the host.

The present invention also provides network devices such as hosts, switches and routers (and components thereof), which are configured to perform, at least in part, the methods described herein. For example, in some implementations the TOE is implemented in a line card (a/k/a a "blade") of a network device, sometimes referred to herein as an "IPS blade." When the invention is used to implement network storage involving storage devices in an FC network, the network device also includes an FC blade.

Preferred implementations of the invention involve communication between a TOE and a NAS device. In some embodiments of the invention, communications on the NAS device side are implemented by a blade (sometimes referred to herein as an "NSM blade") within the same chassis that includes the IPS blade. For example, both blades may be incorporated within an MDS chassis manufactured by the present assignee. In such implementations, the NSM blade integrates a general purpose processing engine with the MDS Fibre Channel switching infrastructure. The IPS blade is used as a TCP/UDP offload processor for software (e.g., NAS software) running on the NSM blade. Connectivity to storage devices may be provided through existing Fibre Channel line cards. However, in other embodiments of the invention, the NSM blade is part of another network device.

The invention also encompasses networks over which devices may be operated in order to perform some aspects of the invention. According to some implementations, the central components are a host in communication with an offload engine via an FC fabric. The offload engine has access to the networking interface(s). Moreover, the invention includes business methods that may be implemented according to some aspects of the invention.

FIG. 1A is a network diagram that illustrates one exemplary network configuration for implementing some aspects of the present invention. Network configuration 100 includes NAS client 105 in communication with NAS device 125 of network device 120 via TCP/IP network 110. In this example, NAS device 125 is a server that is configured to implement some aspects of the present invention, as will be described in detail below. As is well known by those of skill in the art, either the Network File System ("NFS") application protocol or the Common Internet File System ("CIFS") application protocol is commonly used for communication with NAS devices. NAS client 105 may be, for example, a device such as a laptop or desktop computer operated by a customer such as one of those described above.

IPS blade 115 provides an interface between network device 120 and TCP/IP network 110 and, in this example, includes an offload engine configured according to the present invention. Similarly, FC blade 130 provides an interface between network device 120 and FC network 135. Therefore, network device 120 is an intermediary between TCP/IP network 110 and FC network 135. Accordingly, NAS device 125 can access storage devices 140 of FC network 135 to provide network storage services for NAS client 105.

NAS device 125 is in the same chassis as IPS blade 115 and FC blade 130. In this example, network device 120 is an MDS 9000 Series Multilayer Switch that is produced by the present assignee. NAS device 125, IPS blade 115 and FC blade 130 are interconnected via an internal FC network. These devices will be described in more detail below.

Figure 1B:
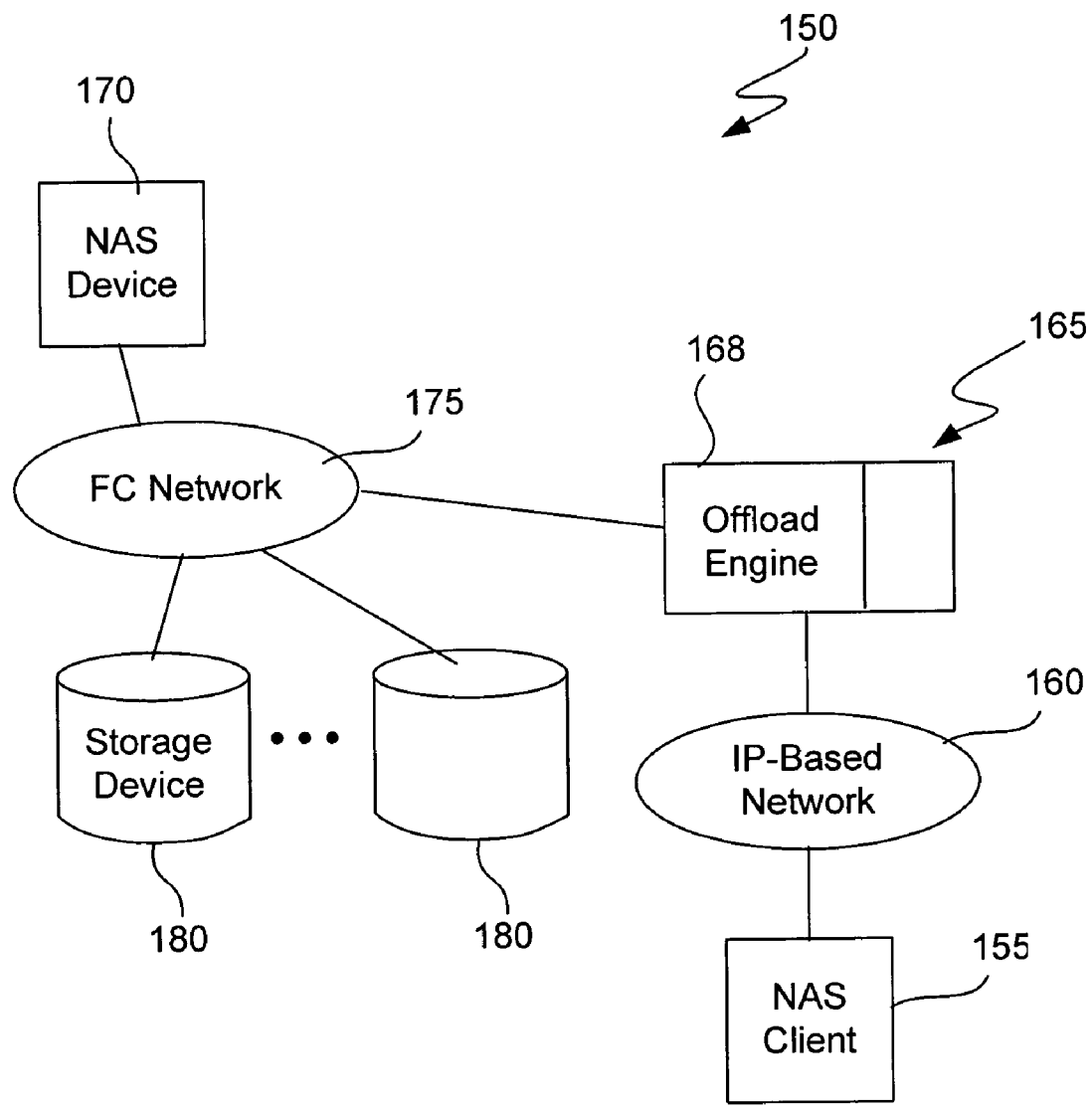

FIG. 1B illustrates an alternative network configuration 150 for implementing the present invention. In network configuration 150, NAS server 170 is in a separate chassis from network device 165, which includes offload engine 168. In network configuration 150, NAS server 170 and storage devices 180 are part of FC network 175. Network device 165 includes FC and IP devices (not shown) similar to blade 115 and FC blade 130 for providing interfaces with IP-based network 160 and FC network 175. Accordingly, NAS client 155 can access NAS server 170 over IP-based network 160 via network device 165.

Figure 2:
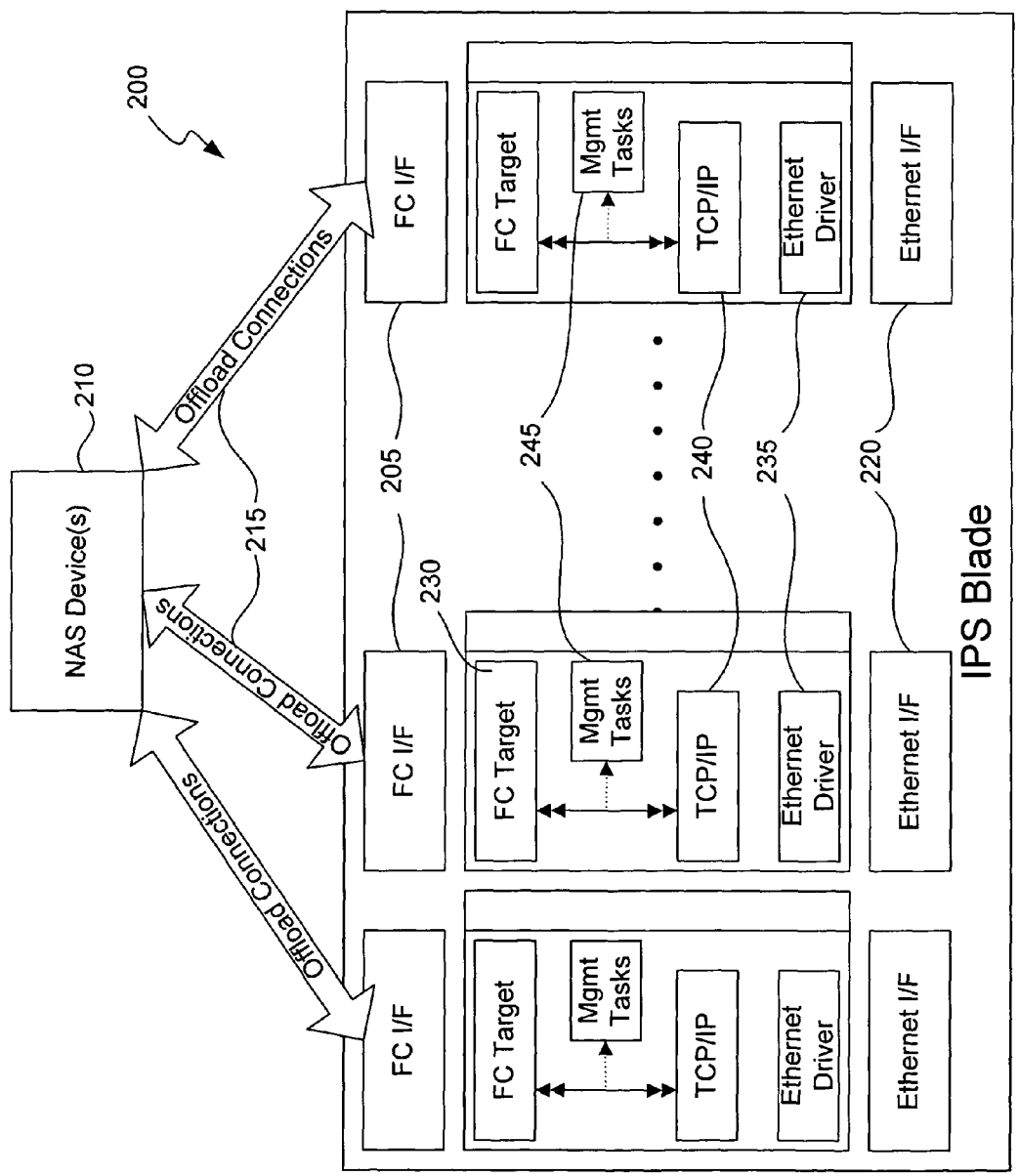
FIG. 2 is a block diagram that depicts a blade that includes offload engines according to an embodiment of the present invention.

FIG. 2 is a block diagram that illustrates some features of an EPS blade 200 according to some embodiments of the invention. In this example, IPS blade 200 includes a plurality of TOEs 225, also referred to herein as "offload cores" or "offload engines." Each offload core will be discovered during the initialization process. In one exemplary embodiment, IPS blade 200 is an eight-port Ethernet line card. There are four other processors that are used to provide the Ethernet interfaces. Each processor has two processing cores. These cores are used to provide networking functionality such as TCP/IP, iSCSI, and FCIP.

Each TOE 225 includes an FC interface 205. IPS blade 200 will communicate with NAS device 210 (a server running NAS protocols) using offload connections 215. The offload connections are analogous to socket-type interfaces. Thus, each TCP connection will have a distinct offload connection, including any listeners. Management messages and control information will be sent over the FC interfaces 205. The offload cores will provide TCP termination for NAS device 210.

The NSM, IPS, and FC blades can be split amongst multiple interconnected chassis that are part of the same FC fabric. For example, NAS device 210 may be in the same chassis as the TOEs 225 (e.g., as shown in FIG. 1A) or elsewhere (e.g., on an FC network as shown in FIG. 1B).

In many implementations of the present invention, a NAS client will access NAS device 210 from an IP network. Accordingly, each TOE 225 also includes an Ethernet interface 220 and an Ethernet driver 235 for communication with an IP network. The offload engines will terminate all protocols up to and including TCP. TCP/IP module 240 performs processing associated with those layers and can provide parsing of the TCP stream to further assist the NAS device. Some embodiments of the IPS blade ports are configurable for iSCSI, FCIP and TCP termination. Module 245 provides processing related to management tasks such as creating the offload connections 225 and retrieving statistics for those connections.

According to methods of the present invention, a proprietary protocol will be used on top of FCP for communications between TOEs 225 and NAS device 210. Direct data placement will be used to allow NAS device 210 to place the socket data at specific locations in local memory. This feature benefits the buffer cache of NAS device 210. In preferred embodiments, one or more components of the TOEs 225 (e.g., TCP/IP module 240) perform the following functions: TCP/IP offload; TCP termination; TCP checksum; handling aggregation of data on a per-socket basis; TCP retransmission; UDP offload; and IP fragmentation handling.

The TOEs 225 assist in the framing of NAS PDUs that are sent to the NAS server software. This feature helps to minimize the movement of data on NAS device 210.

Figure 3:
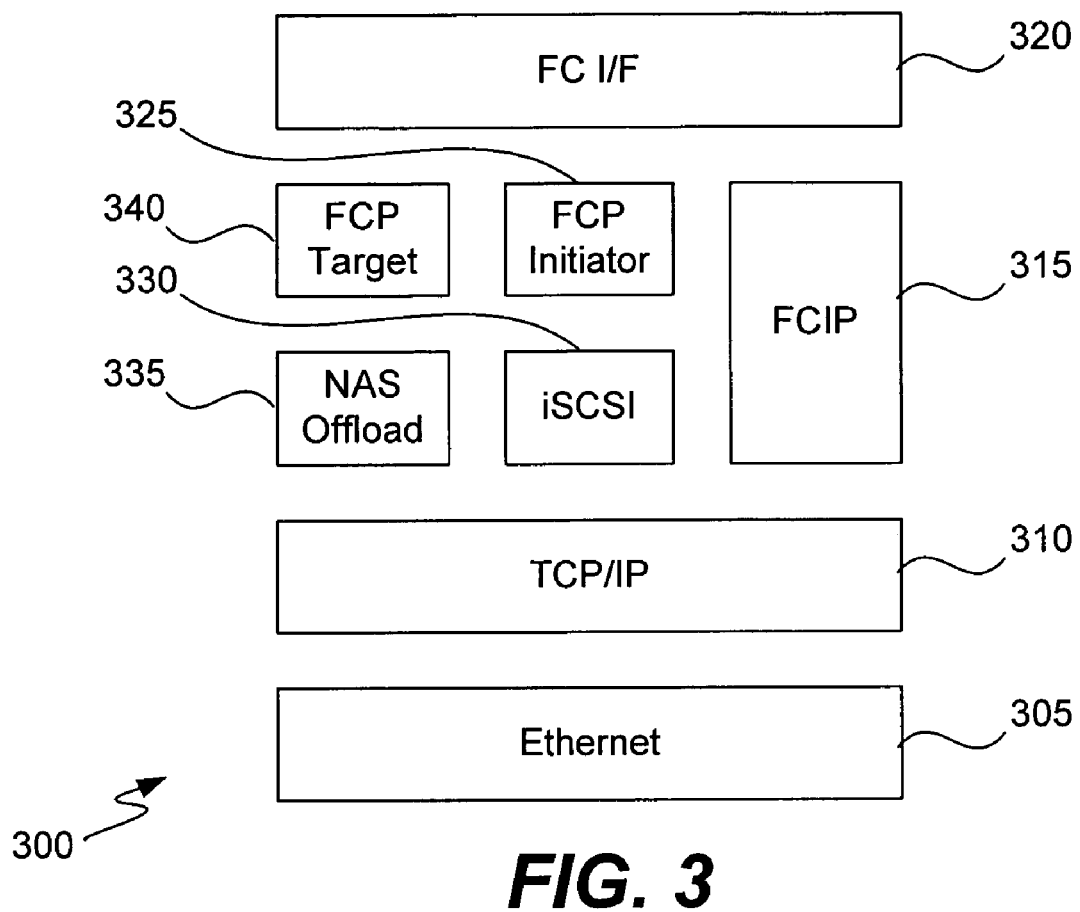
FIG. 3 is a block diagram that depicts software components of the blade of FIG. 2 according to an embodiment of the present invention.

FIG. 3 indicates some illustrative software components 300 of IPS blade 200. Many of these software components may operate in much the same fashion as conventional software components. For example, Ethernet driver 305 and TCP/IP stack 310 may be of a type familiar to those of skill in the art. FCIP module 315 may provide FCIP encapsulation/decapsulation according to methods known to those of skill in the art, or may be proprietary software developed by the present assignee. U.S. patent application Ser. No. 10/351,167 and Ser. No. 10/350,574, entitled "Methods And Devices For Transmitting Data Between Storage Area Networks" and filed Jan. 23, 2003, are hereby incorporated by reference. FC interface 320 may be a conventional interface for handling, e.g., low-level FC framing. FCP target 340 may be structured according to a standard FC protocol implementation.

However, NAS offload 335 provides novel functions according to the present invention. NAS offload 335 takes NAS PDUs that are being received in a TCP/IP stream and frames them appropriately to complete FCP requests that are happening between the offload engine and NAS device 210. Within the FCP protocol there are "initiators" that start transactions with (i.e., request an operation of) a "target." According to a novel protocol of this invention, the offload engine will be an FC target. The NAS device 210 (e.g., a NAS server) will initiate a transaction to FCP target 340. NAS offload 335 receives NAS packets, parses them and responds appropriately to such FCP requests. The NAS offload 335 will utilize the FCP protocol to carry commands between NAS device 210 and IPS blade 200. The process is more complex for data arriving in the Ethernet interface. These processes will be described in more detail below.

NAS device 210 perceives NAS offload 335 (and FC target 340) to be a new SCSI device type, the function of which is to make a bridge between TCP/NAS to SCSI commands and data that go over an FC network. NAS offload 335 performs this task and other tasks according to a command set such as that set forth herein, which was developed by the present inventors. Thus, preferred embodiments of IPS blade 200 will be capable of being used for iSCSI, FCIP and NAS, simultaneously. When used for NAS, the core will provide TCP termination functions for NAS device 210.

Figure 4:
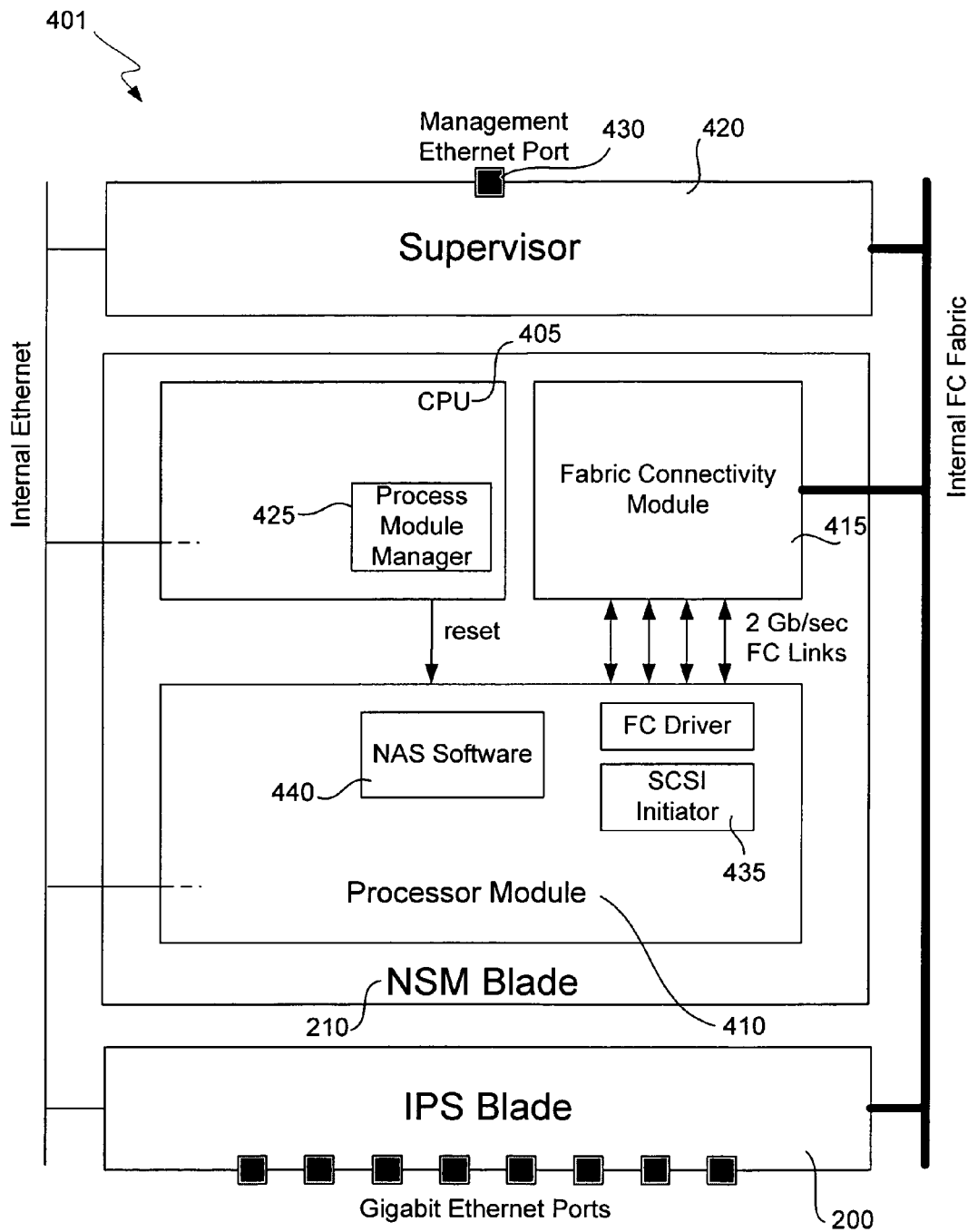
FIG. 4 is a block diagram that depicts a blade that includes components for implementing a NAS device according to an embodiment of the present invention.

FIG. 4 illustrates some components of an exemplary NSM blade according to some aspects of the invention. FIG. 4 illustrates NSM blade 210 within the same chassis 401 as IPS blade 200 and supervisor 420. IPS blade 200 includes TOEs configured according to the present invention. The main components of NSM blade 210 are CPU 405, processor module 410 and fabric connectivity module 415. Although CPU 405 and processor module 410 are configured to perform the methods of the present invention, CPU 405 and processor module 410 may be any CPU and chipset, respectively, so configured. For example, CPU 405 may be a Pentium III microprocessor and processor module 410 may include 1 or more Xeon chipsets.

Various functions of the NSM blade and its interplay with IPS blade 200 and supervisor 420 are set forth in the following paragraphs. It will be appreciated by those of skill in the art that the specific details of the functions described herein are merely exemplary and that many other functions of a similar nature are within the scope of the present invention.

CPU 405 will boot using a bootloader to load a module image from a flash memory. During the boot, processor module 410 will be held in reset. CPU 405 will register with supervisor 420 at this time. If an image version mismatch is found during registration, new firmware for CPU 405 will be downloaded from supervisor 420 and the NSM blade will be reset. If the version matches, the processor module 410 reset line will be released after the fabric connectivity module 415 has been initialized and the Processor Module Manager 425 is started.

Processor module 410 will boot from boot code stored in its flash memory. In this exemplary embodiment, processor module 410 has an Integrated Drive Electronics ("IDE") disk and the boot code will load the previous firmware version from the IDE disk. As the firmware initializes, processor module 410 will initiate communication with CPU 405 and register with the Processor Module Manager 425. In this example, these communications take place over a 10/100 Ethernet connection. Just after registration, Processor Module Manager 425 will verify that processors of processor module 410 are running the proper version. If the active version isn't correct, the processors will reload with the correct version. If the proper image version is not found on the IDE disk, the firmware will initiate a download of the image, e.g., using the 10/100 Ethernet connection to CPU 405.

In this example, the firmware and configuration data for NAS software 440 will be stored on processor module 410's IDE disk. The NAS software 440 may be upgraded, if necessary. For example, the upgrade may be performed via the internal Ethernet.

In some embodiments of the invention, a user may configure the NAS software 440 via Management Ethernet Port 430 of supervisor 420. When the chassis 401 is an MDS, the user will then use the "attach" command of the MDS command line interface ("CLI") to connect to the NAS CLI running on a particular NSM blade. The attach command internally uses telnet to connect to the appropriate NSM blade over the internal Ethernet. The telnet session will be extended to the NAS firmware running on the processor module 410.

Drivers for the FC port and SCSI initiator 435 will be loaded with the NAS firmware on processor module 410. The NAS firmware will use SCSI initiator 435 to communicate with devices available in the FC fabric. The NAS firmware will also be used to communicate with the TCP offload capability provided by IPS Blade 200.

Various interactions between IPS blade 200 and NSM blade 210 will now be discussed. When an Ethernet interface is configured as a NAS termination engine, an additional worldwide port name ("WWPN") will be allocated for the offload connections during startup. This WWPN will be used for all offload connections between the offload processor and NSM blade 210. The offload processor will install the WWPN into the fabric's name server.

NSM blade 210 will behave like any fabric user, logging into the fabric and querying the name server to discover all devices. The offload engines will be discovered in this manner and offload connections can then be formed to each offload processor.

NSM blade 210 will initiate offload connections to each offload engine. In one embodiment, each offload core supports 64K connections. However, the connection identifier may be sized (for example, to 32 bits) to allow the number of connections supported to increase, if necessary. Each offload connection can be thought of as a networking socket. Each connection will be uniquely identified by its connection identifier. The NAS software will also be configured for the IP addresses it will use. A Fibre Channel interface (e.g., Fibre Channel interface 205 shown in FIG. 2) may be used to transport messages, using FCP for the transport protocol.

However, a given offload core may support multiple IP addresses. There may be multiple IP addresses configured for a specific Ethernet interface. VLANs may be deployed, with each VLAN receiving its own IP address.

After the NAS software discovers the offload cores from the FC name server, it will open an offload connection to each core. Using management primitives, the NAS software will be able to retrieve all IP addresses that are configured at each core.

Offload Protocol Overview

In preferred embodiments, FCP information units will be used to carry the offload protocol. This section provides an overview of one exemplary protocol for implementing the present invention. The main focus of this section will be on how the FCP_CMND, FCP_DATA, and FCP_RESP commands are used in an MDS system. However, those of skill in the art will appreciate that variations of the specific commands discussed herein are within the scope of the present invention.

As noted above, connections will be formed between the offload core and a NAS device, which may be a separate NAS server or an NSM blade within the same chassis. These connections are analogous to a socket. Each connection will have a ProviderConnectionId and a UserConnectionId. When the connection is created, the NAS device will define the UserConnectionId and the offload core will define the ProviderConnectionId. For the most part, data sent to the NAS device will contain the UserConnectionId and data sent to the offload core will contain the ProviderconnectionId.

FCP_CMND

The FCP_CMND FCP_LUN will be set to all zeros.

Some of the FCP_CMND FCP_CNTL fields will be allowed. The command reference number will be used to detect dropped frames; section 4.3 provides more detail in this area. The task code must be Simple_Q. The task management flags will be supported with the exception of ClearACA, which must remain 0. The execution management codes will be used to indicate the direction of the data transfer.

Proprietary command descriptor blocks ("CDBs") form the basis of the protocol. In one implementation, the CDBs are 16 bytes with the FCP_DL field following the CDB, as is standard with FCP.

In one example, the FCP_CMND CDB is formatted as follows:

| OffloadClass | OffloadTimeout | Cdb[2] | Cdb[3] |
|---|---|---|---|
| Cdb[4] | Cdb[5] | Cdb[6] | Cdb[7] |
| Cdb[8] | Cdb[9] | Cdb[10] | Cdb[11] |
| Cdb[12] | Cdb[13] | Cdb[14] | Cdb[15] |
| FCP_DL | | | |

The OffloadClass may be set to MgmtClass, SocketClass, TcpClass, or UdpClass. Each of these will be discussed in the sections that follow. In preferred implementations, the OffloadClass values will all adhere to the group code as defined within the SCSI operation code. In some such implementations, this will be used to indicate that our CDBs will be 16 bytes in length.

The OffloadTimeout value is used to limit the time the offload engine has to respond to the command. Zero indicates that there isn't a timeout associated with the command. This time value is specified in seconds.

FCP_RESP

The FCP_RESP will be used to complete commands to the initiator, which will be the NAS device in preferred implementations of the invention. The validity flags in the FCP_STATUS will be used, along with the FCP_RESID, to indicate how much data are left that are pertinent to the command. These are most typically used with the data path traffic. There are three common values. In the first instance, neither FCP_RESID_UNDER nor FCP_RESID_OVER are set and FCP_RESID=0. This combination indicates that the command was processed completely, the requested data were returned and no further data are available (FCP_DL is the amount of data sent).

The second combination is when FCP_RESID_UNDER is set and FCP_RESID>0. This combination indicates that not all data were available. The FCP_RESID will be set to the amount of data that was not returned with the requested command. In other words, this means that FCP_DL was larger than the amount of data that was actually returned.

In a third scenario, FCP_RESID_OVER is set and FCP_RESID>0. This combination indicates that all data were returned and there is an additional FCP_RESID amount of data still available for the NAS device to read (FCP_DL was not sufficient for the amount of data that is available).

Values for the SCSI Status byte will be taken from the SAM-2 specification. Error information will be provided in the sense data of the response. The SCSI status byte will be set to CHECK CONDITION (0x02) and a vendor specific value will define the error in the ASC/ASCQ bytes. These errors include: STATUS_INVALID_CONNECTION, STATUS_INVALID_PARAMETER, etc.

Initiator Commands

This section defines commands that can be issued by the NAS device to the offload engine. Under normal circumstances, none of the commands should timeout. When a request cannot be completed by the offload engine, an FCP_RESP will be generated prior to the NAS device's command timeout value. The status will reflect the state of the command.

In this embodiment, management commands are initiated by the NAS device and are identified by having the OffloadClass field in the CDB set to MgitClass. The NAS device will initiate an FCP_CMND with the CDB set to the specific type of management request. The FCP_CMND will be a read request, with the length set to the expected amount of data, based upon the response. The following commands are executed as an FCP Read Data command:

Read IP Address Request—This command is used to read all IP addresses out of an offload core by the NAS device. The FCP_DL will be set to a sufficiently large enough value to read all of the IP addresses in the offload core.

Read Stats Request—This command is used to read all statistics out of an offload core by the NAS device. These statistics will be relevant to the specific offload connection.

Socket Commands

The following commands may be used for both TCP and UDP connections. These commands are all executed as an FCP Read Data command:

SocketBind—This command is used to setup a connection on an offload core by the NAS device.

SocketClose—The SocketClose request is used to close an existing connection or prevent a newly-opened listener connection from being created.

SocketStats—This command is used to read all statistics for a connection.

TCP Commands

TCP commands are identified with the OffloadClass set to TcpClass. These commands are used to create new connections, transfer data, and perform other tasks associated with a TCP connection. Unless otherwise noted, TCP commands are all executed as an FCP Read Data command:

SocketConnect—This command is used to setup a connection on an offload core by the NAS device.

SocketListen—This command is used to wait for connections to arrive on a listener. Even if multiple listeners have been setup, a single SocketListen can be used since the SocketClientConnectionId is provided in the response when a SYN packet is received.

SocketAccept—This command is used to setup a connection on an offload core by the NAS device in response to a SocketListen.

SocketNasPeek—SocketNasPeek is the starting point for retrieving data by the NAS device from the offload engines. It is used to solicit parsed NAS commands from any TCP connection that isn't currently being "peeked" by the NAS device. Once data have been received on a connection, the NAS header will be returned with a SocketNasPeek FCP_RESP. In preferred implementations, connections will be processed in a FIFO manner.

SocketRead—This request is used to read data from a specific connection. This command is typically used in response to a SocketNasPeek, when the NAS device is already aware of how much data is on the socket. This command is used to read data from the socket and place it into a specific location on the NAS device.

SocketWrite (FCP Write Data)—This command is used to send data as well as NAS responses to the NAS clients on a TCP connection. All data will be placed into the connection.

UDP Commands

UDP commands are identified with the OffloadClass set to UdpClass. These commands are used to create new connections, transfer data, and perform other tasks associated with a UDP connection. Unless otherwise noted, these commands are all executed as an FCP Read Data command:

SocketNasPeek—This command is used to wait for data to arrive on a UDP connection. Even if multiple connections have been setup, a single SocketNasPeek can be used since the SocketClientConnectionId is provided in the response when a packet is received.

SocketRead—This request is used to read data from a specific connection. This command is typically used in response to a SocketNasPeek, when the NAS device is already aware of how much data is on the socket. This command is used to read data from the socket and place it into a specific location on the NAS device.

SocketWrite (FCP Write Data)—This command is used to send data on a UDP port. Preferably, all data will be placed into a single IP packet.

It is possible that the NAS device could read UDP packets out of order. Initially, the packet header will be sent in order but it would be possible for the NAS device to read the remainder of the packet in any order. If desired, the offload engine can queue packets from the same source and deliver one after the other. If that is the case, the RES_ID should reflect the amount of data left for the active packet.

Data Transfer Overview

For both TCP and UDP, data may be sent with the appropriate write command. A good FCP_RESP lets the NSM know that the data were transmitted properly. Receiving data is more complex, because in preferred implementations the NAS device is the initiator and it is important to keep the number of outstanding requests to a minimum for efficiency. Both TCP and UDP will use the common peek then read approach, as set forth in more detail below.

Parsing

Figure 5:
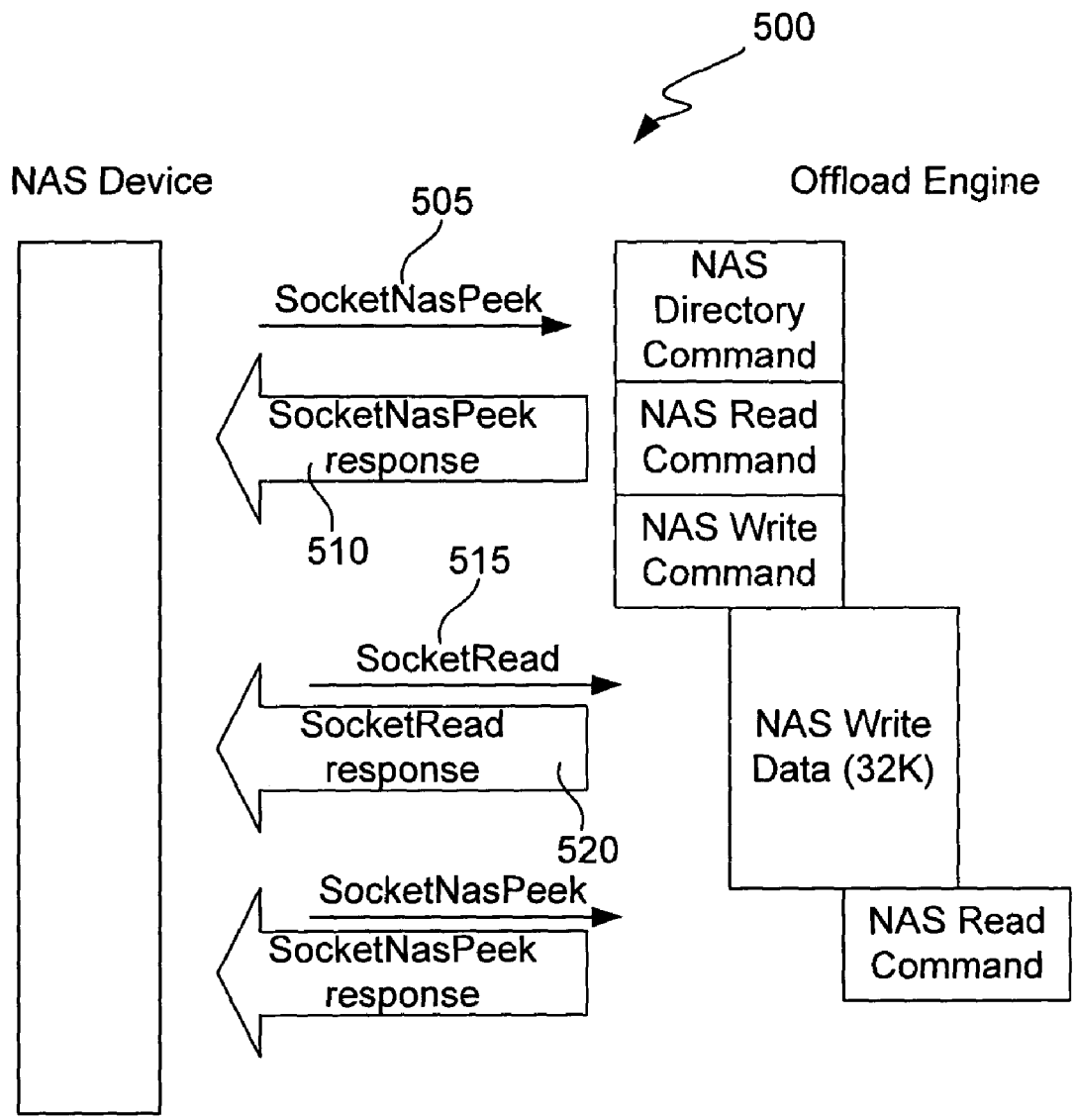
FIG. 5 is a diagram that illustrates a high-level view of command aggregation and parsing according to some implementations of the invention.

A simplified data transfer process 500 will now be described with reference to FIG. 5. The blocks on the "Offload Engine" side indicate commands and data that are received from a NAS client by an offload engine over an IP network.

SocketNasPeek command 505 from a NAS device starts the receive process. The SocketNasPeek is intended to retrieve all of the control information associated with the NAS request. Typically the FCP_DL will be set to a value that is sufficient to retrieve the largest command information. The offload core will parse the receive stream and preferably will only return header information in SocketNasPeek response 510. The header will remain in the socket.

In the case of a NAS write request, the NAS device will then issue SocketRead 515 on the connection to retrieve the data associated with the command. SocketRead 515 preferably has a parameter that will allow a specified amount of data to be dumped from the stream before beginning the transfer (SocketRead response 520). This mechanism prevents the header from being transferred multiple times.

Thus, when multiple commands are in the receive buffer for a specific connection, they can be delivered to the NAS device together in a single SocketNasPeek response. In this implementation, the response is limited by the size of SocketNasPeek FCP_DL value (no partial commands will be delivered to the NAS device) or the presence of a NAS write command.

Data Retrieval

Figure 6:
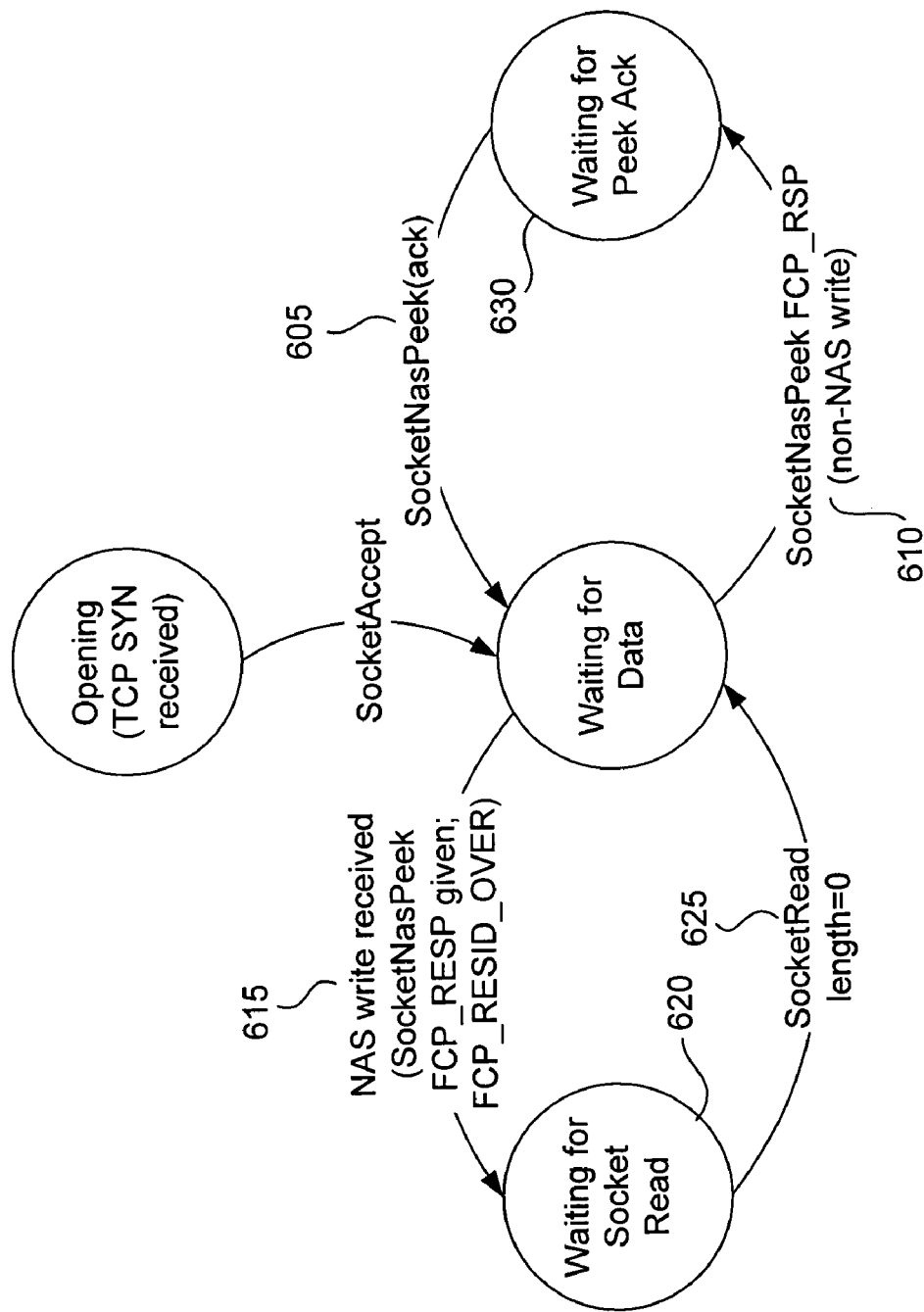
FIG. 6 is a state diagram illustrating offload socket states according to some implementations of the invention.

An exemplary data retrieval process will now be described with reference to FIG. 6. FIG. 6 indicates various states of an offload engine during the data retrieval process and related processes.

With TCP, SocketNasPeek 605 is issued by the NAS device. Any number of SocketNasPeeks can be simultaneously issued, because they can receive data from any socket. When data are received on a TCP connection, a SocketNasPeek will return the UserConnectionId along with the requested data in an FCP_DATA and FCP_RESP sequence (610) from the offload core.

If the last NAS command is a write (615), the connection will then move to "Waiting for SocketRead" state 620. The connection will then be read sequentially via a series of SocketReads 625. The SocketRead with a new command reference number also serves as an Ack for the data sent on a previous read and will allow the offload engine to free the acknowledged data. In the case of a NAS write, it is possible that the SocketRead may timeout prior to all of the data being delivered from the client. When this occurs, an under-run will be indicated and the NAS device must generate another SocketRead to gather the remainder of the write data.

If the last command is anything else, the connection will stall until the data is acked by the NSM. Hence, it will move to a "Waiting for Peek Ack" state 630. A subsequent Socket- NasPeek command will provide the Ack for the data passed in the last SocketNasPeek FCP_RESP.

UDP uses a very similar mechanism. A connection exists for each listener. When a UDP packet is received, some or all of the data are delivered in response to a SocketNasPeek. The SocketNasPeek response has a header that precedes these data, which will identify the remote client, the listener connection id, and a tag which will be used to read the remainder of the packet. Like TCP, the remainder of a UDP packet will subsequently be read using one or more SocketReads.

For both TCP and UDP, all NAS headers are delivered to the NAS device with an FCP_RESP to a SocketNasPeek. The subsequent SocketNasPeek will preferably also piggyback the acknowledgement, so that received data can be freed. In the case of a NAS write command, the remainder of the data are read using one or more SocketReads; eventually the last data are acknowledged with a SocketRead of zero length.

Guaranteed Delivery

The offload commands will be sent over FC class 3. Therefore, it is possible that frames could be dropped without lower layer recovery. However, since this will most generally be across the internal switch, such frame dropping should be rare.

One way to handle dropped frames is to detect the lost frames and simply drop the connection and let the client reconnect and reissue their requests. Alternatively, the offload protocol can recover and reissue the commands.

The keys to detecting lost frames will be the FCP_CNTL command reference number and timers. In some implementations, command references numbers will cycle within the following categories: (a) Each TCP connection; (b) Each UDP listener; (c) Management Commands; (d) TCP SocketNasPeeks & SocketListens; and (e) UDP SocketNasPeeks. In one such implementation, the command reference number field is 8 bits wide.

Figure 7:
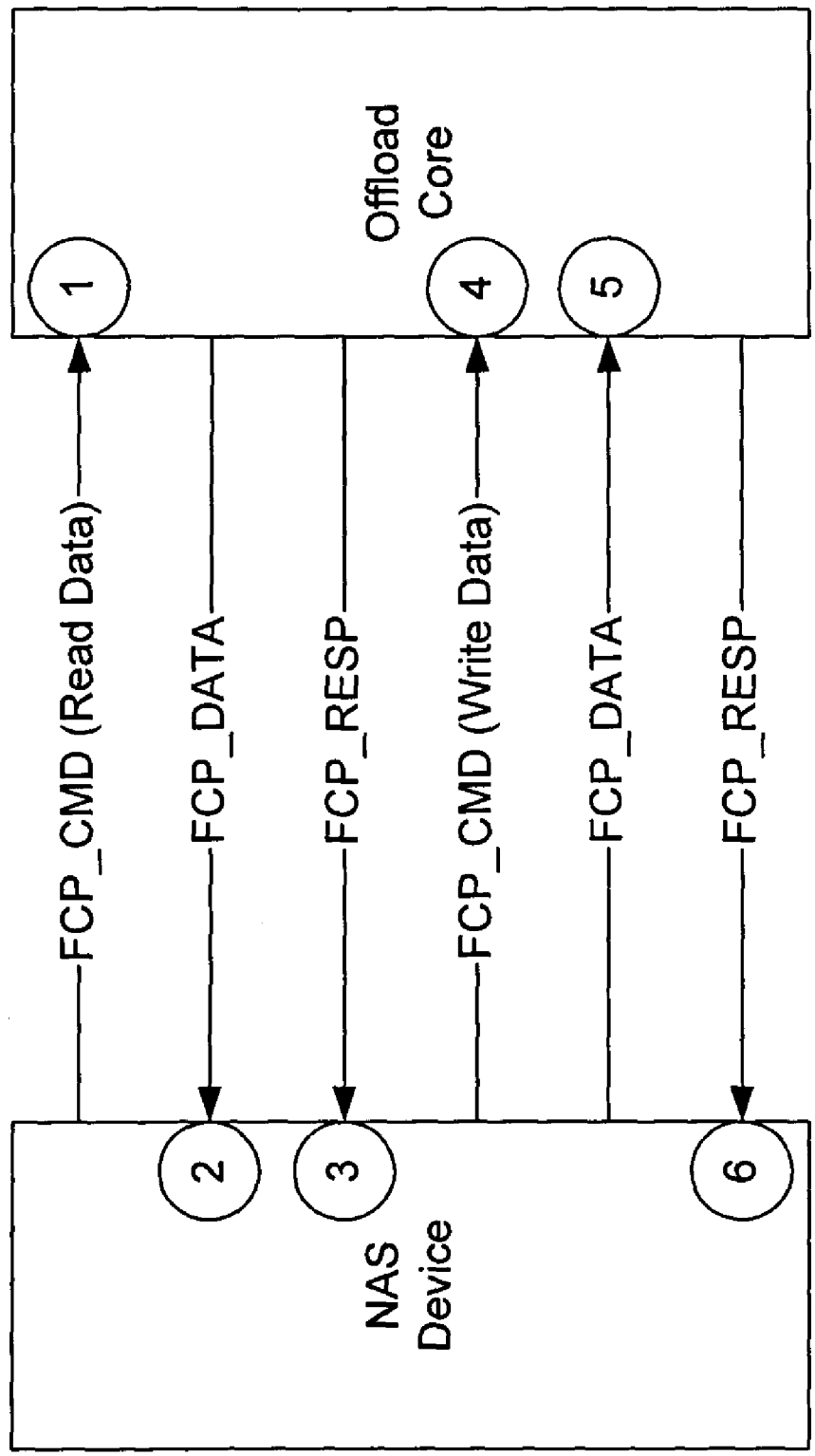
FIG. 7 is a block diagram that indicates situations in which frames may be dropped.

FIG. 7 depicts all of the possible phases wherein data frames can be lost when using this exemplary implementation. As noted in FIG. 7, frames may be dropped when an FCP_CMD (read data) command is sent to the offload engine (case 1), when an FCP_CMD (write data) command is sent to the offload engine (case 4) or when an FCP_DATA command is sent to the offload engine (case 5). Frames may also be dropped when an FCP_DATA command is sent to a NAS device (case 2) or when an FCP_RESP command is sent to NAS device (cases 3 and 6).

The following table indicates how each of the lost frame conditions are handled for each command reference category and "lost frame" case, for one exemplary implementation of the invention.

| Cmd Ref Class | 1 | 2 | 3 | 4 | 5 | 6 |
|---|---|---|---|---|---|---|
| TCP Connection | A | C | A | A | F | G |
| UDP Listener | A | C | A | A | F | G |
| Mgmt | B | D | B | n/a | n/a | n/a |
| TCP SocketNasPeek & SocketListen | B | E | B | n/a | n/a | n/a |
| UDP SocketNasPeek | B | E | B | n/a | n/a | n/a |

Condition "A" is a command timeout, wherein the NAS device will issue an abort task command and reissue the command (with the same command reference number) once the abort has completed. Condition "B" is command timeout, wherein the NAS device will issue an abort task command and issue a new command (with a new command reference number).

In conditions "C" through "F," a command completes with missing data. For condition "C," the command completion status of the NAS device's FCP initiator (along with the FCP_RESP) will indicate that the offload engine transmitted more data than were actually received by the NAS device. The NAS device will discard all data received and reissue the command with the same command reference number. For condition "D," the NAS device will reissue the command with a new command reference number.

Condition "E" indicates that the NAS device is not able to detect which connection received the data. Since a SocketNasPeek will not timeout under normal circumstances, the command will be aborted and issued with a new command reference number. The abort will trigger the offload engine to return the data on another SocketNasPeek. In condition "F," the FCP_RESP will indicate the quantity of data transferred. Since the data may have already been forwarded out the Ethernet interface, the NAS device will issue a new write beginning at the proper location.

Condition "G" indicates a command timeout. Here, the NAS device will issue an abort task and reissue the command with the same command reference number once the abort task completes. The offload core will then discard all data and return a good FCP_RESP.

If communication completely fails, the IPS blade will not receive any new commands. In preferred implementations, a timeout will occur that will drop all connections and discard the received data. The NAS device preferably has a similar timer.

FCP Encapsulation Examples

The FCP protocol will preferably be used to perform direct data placement from the offload processor into a data cache on the NAS device. Custom CDBs defined above are encapsulated within FCP to perform the offload/NAS interaction. This section defines how the FCP commands are used together to perform direct data placement on the NAS device according to some implementations of the invention.

TCP Examples

The NAS device will operate as an initiator and the offload processor will be the target. The NAS device will initiate a fixed number of SocketNasPeeks; these commands will be pending until data is received over any existing socket. The data length requested will be set to the typical amount of header data plus enough to cover the select response header. The FCP_DATA returned on a select will have the response header (which will at least include the connection identifier) followed by the typical amount of header data. The resulting FCP_RESP will be used to indicate the quantity of data that was actually transferred and how much data remains in the socket.

The above process describes how NAS commands are received. Data on a NAS write will be placed into the buffer cache much the same way it is when read from a SCSI disk. The select process gives the NAS device the knowledge of which connection has data, along with the NAS command. The subsequent SocketRead will be given to the NAS device's FC driver, along with details of where to place the data.

Responding to a NAS Read is simply a SocketWrite. The SocketWrite contains all the data to be pushed into the offload connection, including any NAS header and its associated data.

As an optimization, the FCP_RESP always contains the total amount of data remaining in a socket. When a subsequent NAS command is received prior to the current one completing, this will trigger the NAS device to issue a new SocketRead for the selected socket. There is no reason to use the added overhead associated with a SocketNasPeek. Furthermore, should multiple commands be stacked in a socket, the NAS device can direct the data for a specific response to be placed into the data cache while the header for the next command is read into a separate control structure, thus expediting the issuance of the next command.

Figure 8:
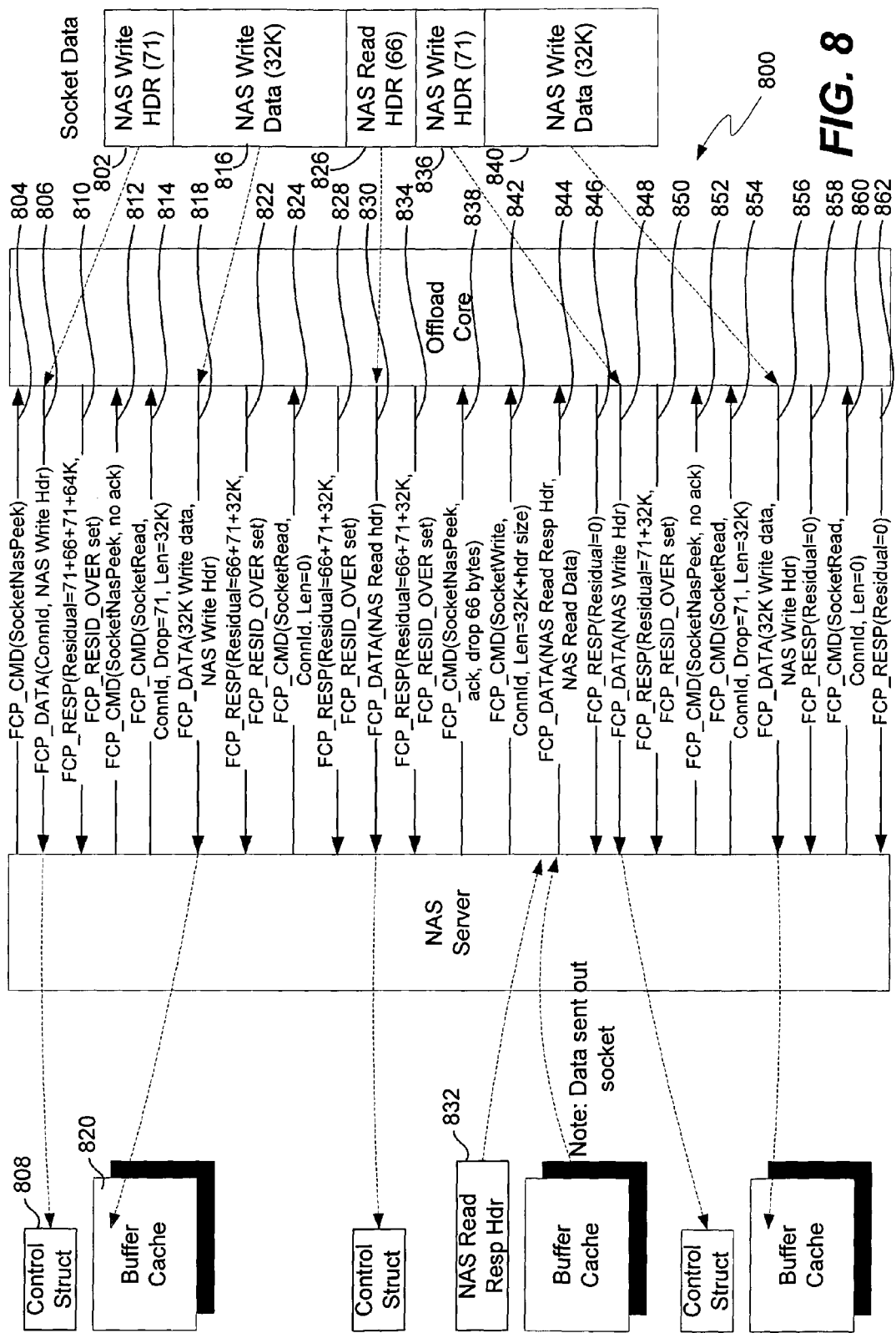
FIG. 8 is a flow diagram that illustrates direct data placement according to some implementations of the invention.

One such multiple-command scenario is depicted in FIG. 8. In this example, all of the components of data in an offload engine arrived (across an IP network from a NAS client) at approximately the same time. These components are a 71 byte NAS write header 802, 32K NAS write data 816, 66 byte NAS Read Header 826, 71 byte NAS write header 836 and 32K NAS write data 840. In this example, NAS read and NAS write headers are sent separately. However, in alternative implementations, NAS read and NAS write headers may be sent together (as shown in FIG. 5).

Here, a NAS device initiates process 800 by sending SocketNasPeek command 804 to the offload engine. The offload engine has parsed the data components and sends response 806, indicating its connection ID and the NAS write header of data component 802. The NAS write header is placed in control structure 808 of the NAS device. The write header indicates that there are 32K of write data coming and a space is allocated in buffer cache 820 of the NAS device.

The offload engine also sends response 810, indicating the sizes of the 3 header components in the offload engine (71+66+71) and the total amount of data (64K). At this time, the NAS device sends another SocketNasPeek command 812 with no Ack: a large number of SocketNasPeek commands may be outstanding at any given time. By sending this command, the NAS device is, in essence, inviting another offload engine to indicate what data it may have to transmit.

The NAS device then sends SocketRead command 814, specifying the NAS write data 816 to be transmitted from the offload engine to the NAS device and instructing the offload engine to drop or purge component 802 ("Drop=71"). At this time, the offload engine purges component 802. The offload engine sends the data (818) and the NAS device places these data in the designated part of the buffer. The offload engine then sends response 822, indicating what remains to be transmitted. The NAS device sends command 824, which is an "Ack" indicating successful receipt of the data sent by the offload engine. At this time, the offload engine purges component 816. The offload engine then sends response 828, indicating what remains to be transmitted.

In response 830, the offload engine transmits the NAS read header of component 826. The NAS read header is placed in a control structure 808 of the NAS device. The offload engine sends response 834, indicating what remains to be transmitted. The NAS device sends SocketNasPeek command 838 with an Ack and an instruction to drop component 826. The offload engine complies. The NAS device then sends SocketWrite command 842, indicating the size of data to be written and the offload engine ID to which the data will be written. The NAS device then sends the data to the offload engine (844).

In transmission 848, the offload engine sends the NAS write header of component 836. The offload engine NAS device prepares a space in its buffer for write data 840. The offload engine then sends response 850 indicating what remains in the offload engine's buffer. The NAS device sends another SocketNasPeek command (852) and then sends SocketRead command 854 directed to NAS write data 840. The offload engine sends NAS write data 840 in transmission 856 and the NAS device writes these data to the designated portion of its buffer cache. The offload engine then sends response 858, indicating that all data have been transmitted. After receiving an Ack from the NAS device (860), the offload engine purges component 840 and then sends response 862, indicating that there are no additional data to transmit.

Figure 9:
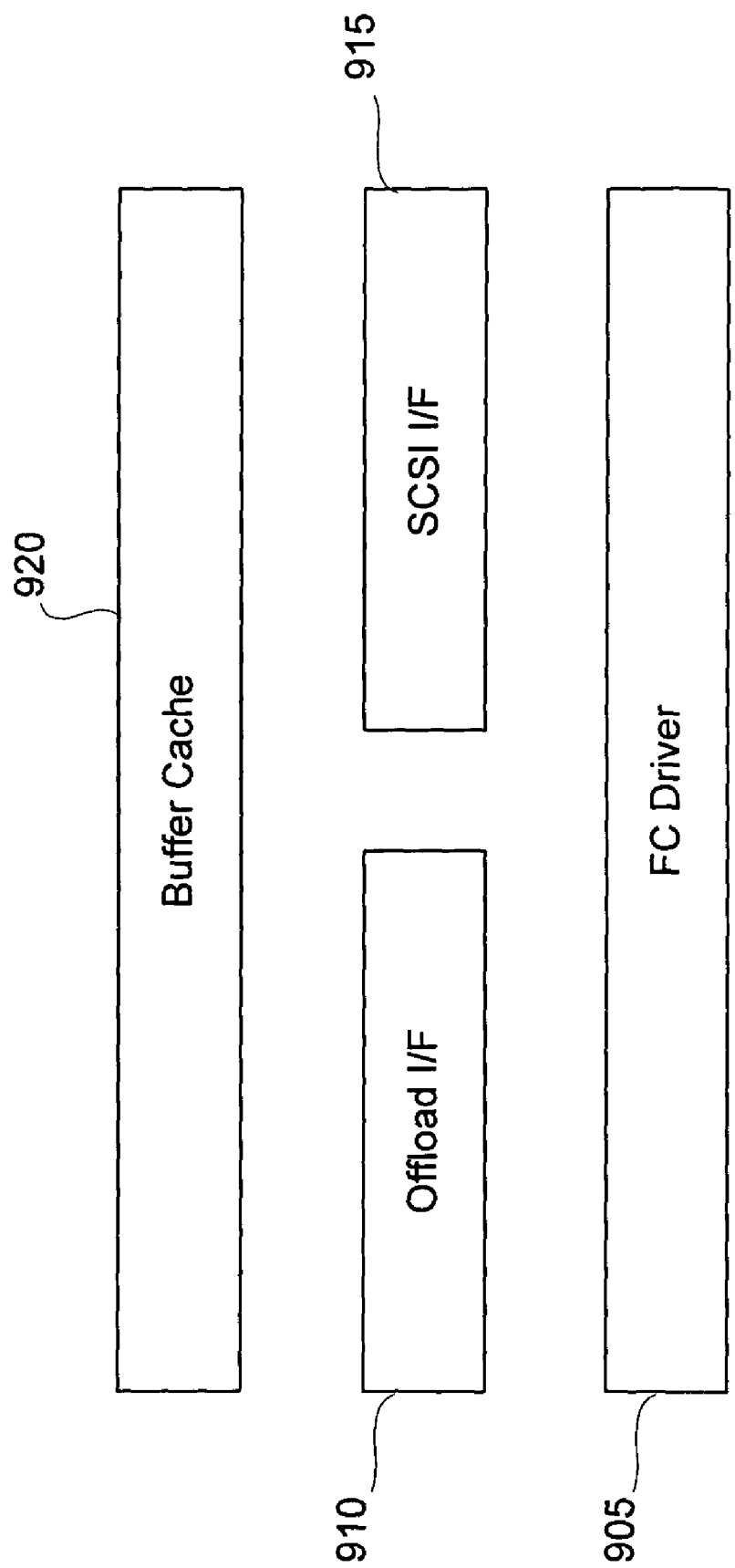
FIG. 9 is a block diagram that depicts software components of a NAS device according to an embodiment of the present invention.

FIG. 9 is a simplified block diagram that indicates some components that would reside on a NAS device, whether the NAS device is a separate NAS server or a NSM blade in the same chassis as the offload engines. The NAS device includes an FC initiator and uses it to communicate with the offload processor and SCSI devices. Offload I/F 910 is built much like SCSI interface 915. It accepts read requests with directions as to where to place data in buffer cache 920.

As already mentioned, the process begins with a SocketNasPeek to retrieve header information for a NAS command. Once the header has been parsed and the command interpreted, a SocketRead or SocketWrite can commence. In the case of a NAS write, a SocketRead would be formatted for the length of the data being written by the client. The destinations and lengths of the data would be specified in the request that is built for FC driver 905.

Figure 10:
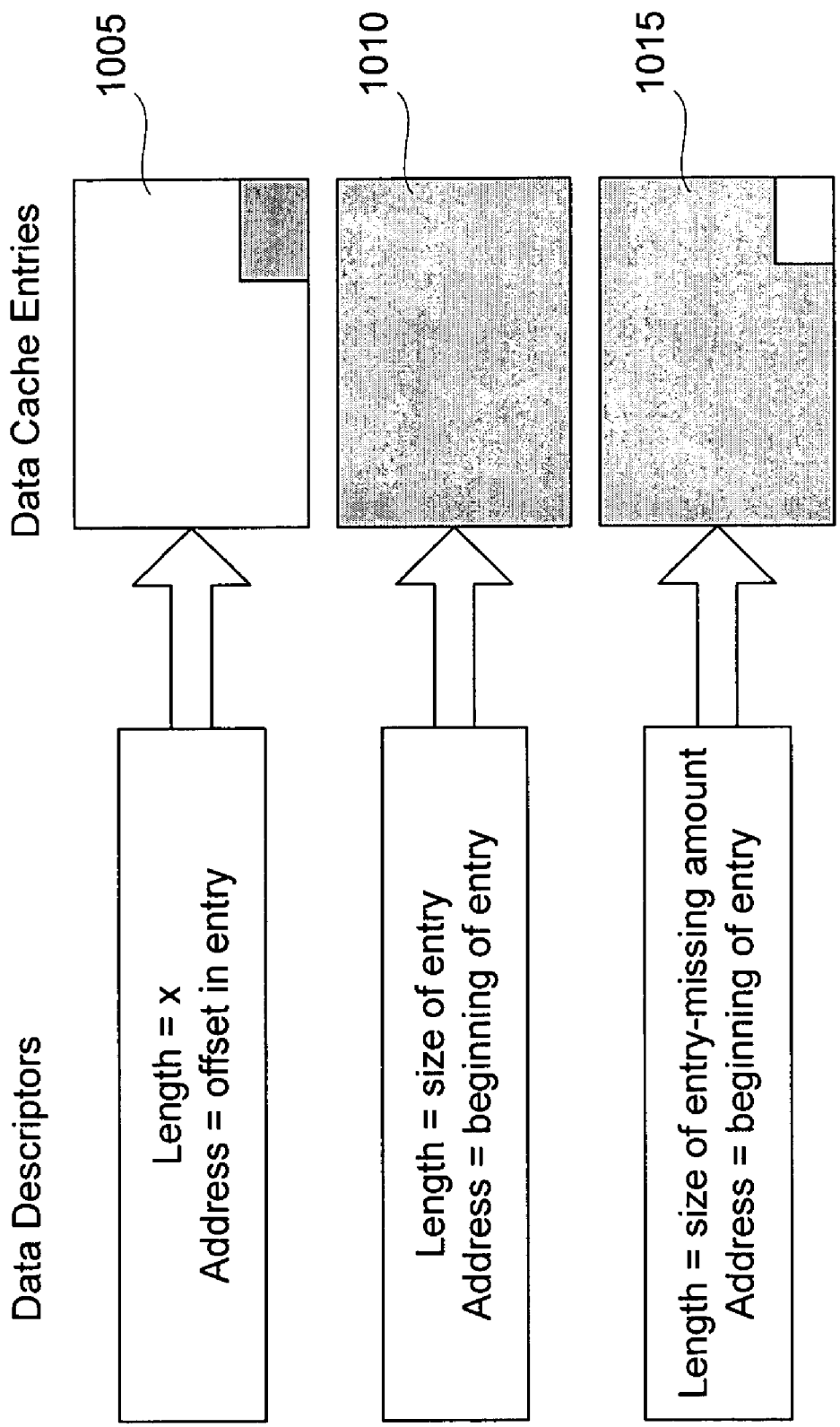
FIG. 10 illustrates direct placement of data into buffer caches according to some aspects of the present invention.

Assuming the data being written would span three data cache entries, FIG. 10 depicts how the data descriptors are built for the FC request. For the first data cache entry 1005, the data descriptor indicates a length and an address, which indicates where to begin writing the data. In this example, the address is an offset in data cache entry 1005. For the next data cache entry 1010, the data descriptor indicates a length (the size of data cache entry 1010) and an address, which is the beginning of data cache entry 1010. For the third data cache entry 1015, the data descriptor indicates a length (the size of data cache entry 1015 minus an amount that will not be required to write the remaining portion of the data) and an address, which is the beginning of data cache entry 1015. Thus, the NAS data are directly placed into the data cache, regardless of the number of FCP_DATA frames it takes to deliver it to the NAS device.

UDP Examples

UDP operates much like TCP. The SocketNasPeek command is used to retrieve the header for the command. The SocketRead is then used to directly place data into the NSM memory.

Because information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of architectures.

Alternative embodiments of this invention can provide even more offloading and programming efficiency for the NAS device. For example, the offload engine could provide parsing assists for any type of NAS protocol; the offload engine could provide additional data integrity checks on the NAS data such as MD5 or a CRC mechanism; and the buffer cache itself could be moved into the offload engine so that the data aren't moved to the NSM device 125 but instead are directly moved between the storage device 140 and the NAS client 105 via the offload engine within 115.

It is therefore intended that the invention be interpreted to include all variations and equivalents that fall within the true spirit and scope of the present invention.

We claim:

1. A method for implementing network storage, the method comprising:
   at a network device, receiving data having a protocol for transmitting over an Internet Protocol network, wherein the received data is sent from a network attached storage (NAS) client on the IP network and includes write data and a write request that indicates writing the write data from the NAS client to a NAS device;
   parsing the received data; and
   transmitting a write request indicator based on results from the parsing step and using a protocol for transmitting over a Fibre Channel (FC) network to a NAS device via the FC network, wherein the transmitted write request indicator indicates that the NAS device is to read data that corresponds to the received write data from a Transport Control Protocol (TCP) offload engine for performing a data integrity check, wherein the TCP offload engine is associated with the network device allocating a memory space of the NAS device according to the results from the parsing step;
   receiving a read command from the NAS device;
   in response to the read command, transmitting the received write data to the NAS device to thereby cause the received write data to be stored in the allocated memory space;
   wherein the Transport Control Protocol (TCP) offload engine is further configured to terminate all protocols up to and including Transmission Control Protocol (TCP) on the FC network.

2. The method of claim 1, wherein the transmitting step is performed in response to a query from the NAS device.

3. The method of claim 1, wherein the transmitted write indicator comprises NAS header information from the received write request.

4. The method of claim 1, wherein the transmitting step further comprises transmitting connection identification information including a world wide port name (WWPN) for a connection with the Transport Control Protocol (TCP) offload engine so that the NAS device perceives the TCP offload engine as a new device of the FC network.

5. The method of claim 1, wherein the parsing step comprises parsing NAS protocols of the stored information.

6. A method for implementing network storage, the method comprising:
   at a network device, receiving a data read request received from a network attached storage (NAS) client on an Internet Protocol (IP) network, the data read request sent to a NAS device and having a protocol for transmitting on the IP network and being directed towards a storage device;
   parsing the received data read request by allocating a memory space of an offload engine that performs the parsing step, wherein the parsing includes performing a data integrity check on data received from the NAS client or the NAS device; and
   reading data from the storage device via a Fibre Channel (FC) network based on the parsing of the received data read request by using a protocol for transmitting on the FC network, wherein reading the data comprises sending a write indicator that indicates that the NAS device is to write data to the allocated memory space of the offload engine allocating a memory space of the NAS device according to the results from the parsing step;
   receiving a read command from the NAS device;
   in response to the read command, transmitting the received write data to the NAS device to thereby cause the received write data to be stored in the allocated memory space;
   wherein the Transport Control Protocol (TCP) offload engine is further configured to terminate all protocols up to and including Transmission Control Protocol (TCP) on the FC network.

7. The method of claim 6, further comprising:
   receiving data responsive to the data read request directly from the storage device; and
   storing the responsive data in the allocated memory space.

8. A line card, comprising:
   a Fibre Channel (FC) interface;
   an Ethernet interface configured to receive data in the form of a read request or a write request from a network attached storage (NAS) client and having a protocol for transmitting over an Internet Protocol network, wherein the received data is sent from a network attached storage (NAS) client on the IP network;
   a memory; and
   an offload engine configured to do the following:
      parse the received data; and
      transmit a plurality of packet data units (PDUs) for the NAS device to read data from the NAS device when a write request is received or for the offload engine to write data to the NAS device when a read request is received, wherein the PDUs are based on the results from the parsing step and use a protocol for transmitting over a Fibre Channel (FC) network to a NAS device via the FC network via the FC interface allocating a memory space of the NAS device according to the results from the parsing step;
   receiving a read command from the NAS device;
   in response to the read command, transmitting the received write data to the NAS device to thereby cause the received write data to be stored in the allocated memory space;

wherein the Transport Control Protocol (TCP) offload engine is further configured to terminate all protocols up to and including Transmission Control Protocol (TCP) on the FC network.

9. The line card of claim 8, wherein the offload engine transmits the plurality of PDUs in response to a query from the NAS device.

10. The line card of claim 8, wherein the results comprise NAS header information.

11. The line card of claim 8, wherein the offload engine is further configured to transmit connection identification information with the results of the parsing step.

12. The line card of claim 8, wherein offload engine parses NAS protocol portions of the received data.

13. The line card of claim 8, wherein the offload engine is further configured to perform a data integrity check on data received from the NAS client or the NAS device.

14. A network device comprising the line card of claim 8, wherein the line card is one of a plurality of line cards incorporated in a chassis.

15. A computer network comprising the line card of claim 8 and the NAS device.

16. The network device of claim 14, further comprising the NAS device.

17. A Transmission Control Protocol (TCP) offload engine, comprising:
   means for receiving data having a protocol for transmitting over an Internet Protocol network, wherein the received data is sent from a network attached storage (NAS) client on the IP network and includes write data and a write request that indicates writing the write data from the NAS client to a NAS device;
   means for parsing the received data; and
   means for transmitting a write indicator based on results from the parsing step and using a protocol for transmitting over a Fibre Channel (FC) network to a NAS device via the FC network, wherein the transmitted write indicator indicates that the NAS device is to read data that corresponds to the received write data from a Transport Control Protocol (TCP) offload engine for performing a data integrity check, wherein the TCP offload engine is associated with the network device means for allocating a memory space of the NAS device according to the results from the paring step;
   means for receiving a read command from the NAS device;
   in response to the read command, transmitting the received write data to the NAS device to thereby cause the received write data to be stored in the allocated memory space;
   wherein the Transport Control Protocol (TCP) offload engine is further configured to terminate all protocols up to and including Transmission Control Protocol (TCP) on the FC network.

18. The TCP offload engine of claim 17, further comprising means for terminating all protocols up to and including Transmission Control Protocol (TCP) on the FC network.

19. The TCP offload engine of claim 17, wherein the transmitting means transmits the write indicator results in response to a query from the NAS device.

20. A computer program stored on a machine-readable memory medium, the computer program comprising instructions to control a Transmission Control Protocol (TCP) offload engine to perform the following steps:
   at the TCP offload engine, receive data having a protocol for transmitting over an Internet Protocol network, wherein the received data is sent from a network attached storage (NAS) client on the IP network and includes write data and a write request that indicates writing the write data from the NAS client to a NAS device;
   parse the received data;
   from the TCP offload engine, transmit a write indicator based on results from the parsing step in the form of data having a protocol for transmitting over a Fibre Channel (FC) network to a NAS device via the FC network, wherein the transmitted write indicator indicates that the NAS device is to read data that corresponds to the received write data from the TCP offload; and
   at the TCP offload engine, perform a data integrity check on data received from the NAS client or the NAS device allocating a memory space of the NAS device according to the results from the parsing step;
   receiving a read command from the NAS device;
   in response to the read command, transmitting the received write data to the NAS device to thereby cause the received write data to be stored in the allocated memory space;
   wherein the Transport Control Protocol (TCP) offload engine is further configured to terminate all protocols up to and including Transmission Control Protocol (TCP) on the FC network.

21. The computer program of claim 20, further comprising instructions for controlling the TCP offload engine to terminate all protocols up to and including TCP on the FC network.

22. The computer program of claim 20, wherein the instructions control the TCP offload engine to transmit the write indicator in response to a query from the NAS device.

23. A method of reliably providing account information to a customer, the method comprising:
   at a network device, receiving a read request for account information from a network attached storage (NAS) device, wherein the read request is received from a NAS client and has a protocol for transmitting on an Internet Protocol (IP) network;
   parsing the received read request;
   transmitting a read indicator to the NAS device based on results from the parsing step using a protocol for transmitting over a Fibre Channel (FC) network to the NAS device via the FC network;
   allocating space in a memory of the NAS device according to the results;
   receiving a write command from the NAS device in response to the read indicator; and
   retrieving the requested account information from a storage device on the FC network via the NAS device in response to the write command; and
   storing the requested account information in the allocated memory space allocating a memory space of the NAS device according to the results from the parsing step;
   receiving a read command from the NAS device;
   in response to the read command, transmitting the received write data to the NAS device to thereby cause the received write data to be stored in the allocated memory space;
   wherein the transmitted write request indicator indicates that the NAS device is to read data that corresponds to the received write data from a Transport Control Protocol (TCP) offload engine for performing a data integrity check, wherein the TCP offload engine is associated with the network device;
   wherein the Transport Control Protocol (TCP) offload engine is further configured to terminate all protocols up to and including Transmission Control Protocol (TCP) on the FC network.

24. The method of claim 1 wherein the parsing is performed by the TCP offload engine in a line card that includes an Ethernet interface for communication with the IP network, and includes an FC interface for communicating with the FC network.

25. The method of claim 24 further comprising, the TCP offload engine performing:
TCP/IP offload;
TCP termination;
TCP checksum;
Handling aggregation of data on a per-socket basis;
TCP retransmission;
UDP offload; and
IP fragmentation.

26. The method of claim 24 further comprising, the TCP offload engine assisting in the framing of NAS Protocol Data Units (PDUs).

* * * * *

UNITED STATES PATENT AND TRADEMARK OFFICE
CERTIFICATE OF CORRECTION

| | | |
|---|---|---|
| PATENT NO. | : 7,949,792 B2 | Page 1 of 1 |
| APPLICATION NO. | : 10/836368 | |
| DATED | : May 24, 2011 | |
| INVENTOR(S) | : Kuik et al. | |

It is certified that error appears in the above-identified patent and that said Letters Patent is hereby corrected as shown below:

On the Title Page

Item (12):
  "Kujk" should read --Kuik--.

Item (75) Inventors:
  "Kujk" should read --Kuik--.

Signed and Sealed this
Twenty-eighth Day of June, 2011

David J. Kappos
*Director of the United States Patent and Trademark Office*